United States Patent
McAvoy

[11] 3,929,159
[45] Dec. 30, 1975

[54] POWER TRANSMISSION
[75] Inventor: Dennis J. McAvoy, Lake Orion, Mich.
[73] Assignee: Sperry Rand Corporation, Troy, Mich.
[22] Filed: Feb. 10, 1975
[21] Appl. No.: 548,476

[52] U.S. Cl. .... 137/596.18; 137/596.13; 137/596.2; 91/420; 91/455; 91/464
[51] Int. Cl.² ......................................... F15B 13/04
[58] Field of Search ............ 91/420, 455, 464, 438, 91/446; 137/106, 596.12, 596.13, 596.14, 596.18, 596.2

[56] References Cited
UNITED STATES PATENTS
| | | | |
|---|---|---|---|
| 3,234,957 | 2/1966 | Allen | 137/596.12 X |
| 3,680,588 | 8/1972 | Hufeld et al. | 137/596.18 |

*Primary Examiner*—Irwin C. Cohen
*Assistant Examiner*—Gerald A. Michalsky
*Attorney, Agent, or Firm*—Theodore Van Meter

[57] ABSTRACT

A directional valve for hydraulic power transmission systems of the closed center type has a spool for directing fluid from inlet to either of two motor ports through one or the other of a pair of check valves for holding the load against dropping. A second pair of check valves connect from each motor port directly to a fluid return port independently of the spool. The second check valves have control chambers the maximum pressure in which is limited by a pilot relief valve to cause the check valve to act as a maximum pressure limiting valve for its motor port. Small pilot pistons responsive to operating pressure in the opposite motor port can also release pressure in the control chambers thereby causing the second check valves to act as counterbalance valves to prevent the motor from being driven by an overhauling load. The spool of the directional valve has a float position in which inlet pressure is directed to both small pilot pistons at the same time, causing both of the second check valves to open freely and connect both motor ports directly to the tank ports of the valve, bypassing the first check valves.

2 Claims, 3 Drawing Figures

POWER TRANSMISSION

Hydraulic power transmission systems such as are widely used on mobile material handling equipment use banks of spool type directional valves for controlling the operation of various fluid motors from a common hydraulic pressure supply such as a fixed displacement pump. As the power requirement for machines keep increasing, designers go to higher pressures which impose more stringent demands upon the performance of the control valves. The higher pressures aggravate the problem in two ways: they cause increased flow through the clearance between the spool and the bore of the body in which the spool slides and they cause increased distortion of the valve body tending to shift the valve bore portions out of true axial alignment and concentricity. Decreasing the diametrical clearance between spool and body is necessary to alleviate the first problem of leakage but an increased clearance is the only way to avoid spool sticking problems caused by body distortion. The use of load holding check valves has become common in order to prevent gradual load dropping due to spool leakage but this only partially relieves the problem and is inadequate for very high pressure systems.

It is an object of the present invention to provide an improved directional valve in which full control of motor movement may be obtained under high operating pressures without requiring extremely close fits between the spool and the body particularly at the metering orifice between the cylinder ports and the return passage.

A further object is to provide a valve of this character in which a pilot operated check valve serves to control flow from each motor port directly to a return passage, bypassing both the load holding check valve and the spool valve and which pilot operated check may serve both as a maximum pressure limiting valve for the motor port and also as a counter balance valve.

A further object is to provide a valve of this character having a float position in which both pilot operated check valves may be opened at the same time to permit fluid flow from the motor ports directly to tank, bypassing the load holding check valves.

These objects are achieved by the provision of a directional valve assembly for a hydraulic power system comprising a body having a sliding spool of the closed center type arranged to selectively direct inlet fluid to either of two motor ports, load holding check valves between the spool and each motor port, combined counterbalance and relief check valves one connected between each motor port and a return port, and each having a control piston exposed through a restriction to its respective motor port pressure, pilot valves for relieving the pressure on the respective control pistons at a pre-determined pressure level, and secondary pilot valves each responsive to operating pressure upstream from the load check valve for the opposite motor port, whereby each pilot valve controls one check valve to open it either to limit maximum pressure in its own motor port or in response to operating pressure at an opposite motor port and means controlled by the spool for directing inlet pressure to both secondary pilot valves at the same time for opening both counterbalance and relief check valves to bypass both motor ports to tank around the load holding check valves.

IN THE DRAWINGS

Figure 1:
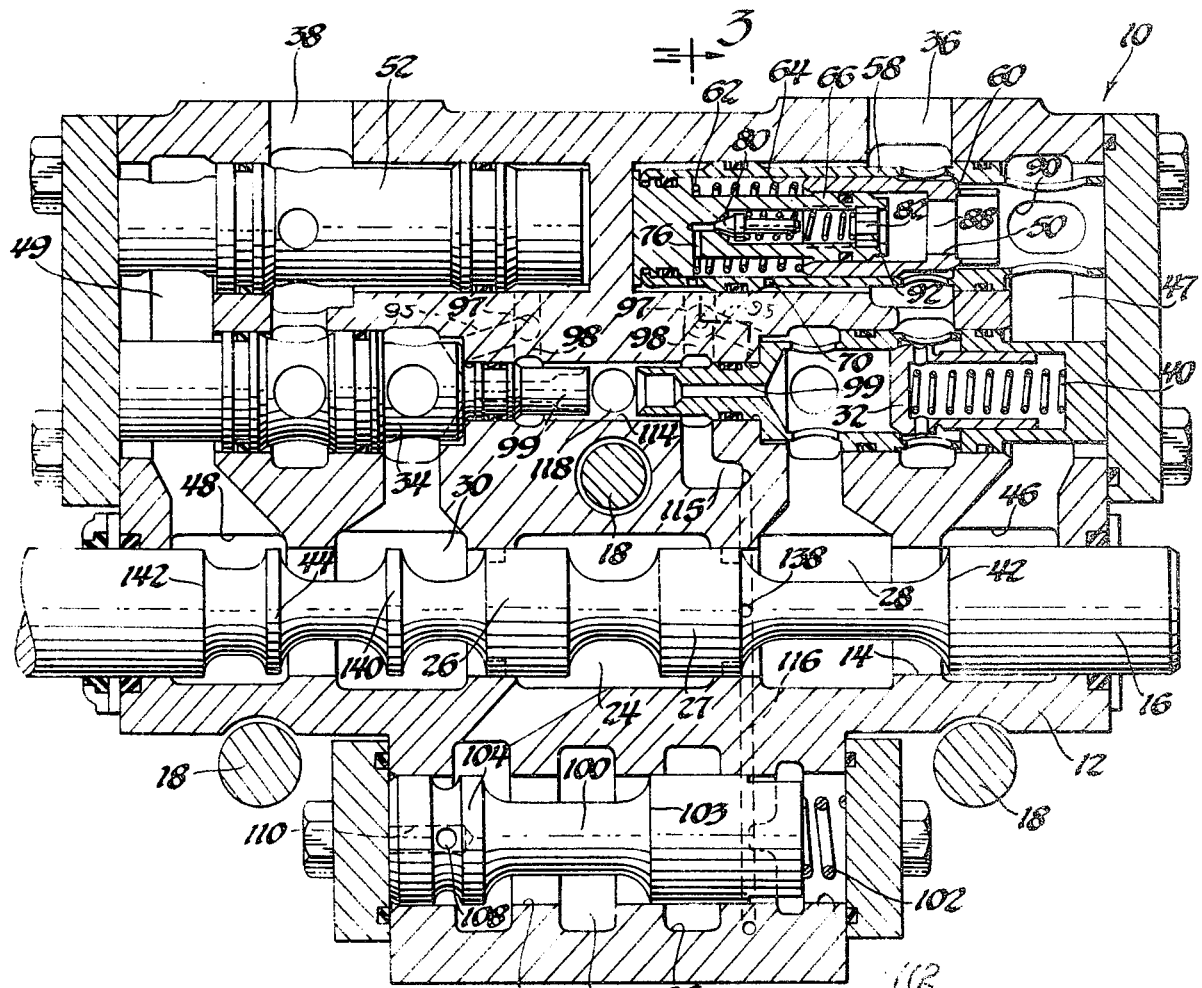
FIG. 1 is a sectional view of a directional valve incorporating a preferred form of the present invention.

The valve 10 of FIG. 1 comprises a body 12 having a principle bore 14 in which is mounted a slideable spool 16. The body 12 is preferably provided with flat sides parallel to the plane of the paper so that it may be stacked with similar valves and bolted together by bolts 18. The body has an inlet port 20 communicating through a bore 22 with a pressure port 24, being an enlargement of the bore 14 at its center. Lands 26 and 27 on the spool 16 close the port 24 in centered position of the spool 16. When the spool is shifted to the left or right, pressure port 24 is connected to port 28 or port 30. These ports lead through check valves 32 and 34 to motor or service ports 36 and 38. The check valves are biased to their seats by springs such as 40 and serve to prevent undesired backflow through the motor port which would otherwise be caused by gravity or other forces acting on a fluid motor.

The spool 16 has end lands 42 and 44 which in the centered position connect the ports 28 and 30 with tank or return ports 46 and 48 which extend through the bank of valves from end to end. This connection need not be a large one since it is only required to carry the small discharge flow from certain pilot valves to be described later. From the ports 46 and 48 there extend passages 47 and 49 leading to pilot operated check valves 50 and 52 which control communication between passage 47 and port 36 and between passage 49 and port 38. Thus, when either valve 50 or 52 is opened, by means later to be descirbed, flow returning from the motor passes directly to the tank or return passage 46 or 48 even though the spool 16 has been shifted to block communication between port 28 and tank port 46 or between port 30 and tank port 48. For this purpose, it is not necessary that the fit between lands 42 or 44 and the bore 14 be an extremely close one since they have nothing to do with blocking return flow from the motor ports 36 and 38.

The construction of check valve 52 is similar to that of check valve 50 which includes a stationary sleeve 58 having a seat 60 on which the check valve 50 rests normally, being biased by a spring 62 and also by the fluid pressure in a chamber 64. A stationary spud 66 on which the valve 50 slides limits the area over which this pressure in chamber 64 is effective. The bore 64 in the sleeve 58 is somewhat larger than the seat 60 resulting in an annular area over which the pressure in port 36 can act to lift the check valve 50 off from its seat 60.

The chamber 64 is in communication with the motor port 36 through a restricted orifice 70. A passage 76 also connects chamber 64 with the inlet port of a pilot relief valve 80. Relief valve 80 has an exhaust port 82 which leads by way of the central bore 88 and holes 90 to the tank port 46. Thus the check valve 50 can act as a maximum pressure limiting valve for the motor port 36. When that pressure reaches a value sufficient to open the pilot valve 80 as determined by the setting of its adjusting screw 92 and the flow through the valve 80 has been sufficient to cause a significant pressure drop through the orifice 70 the pressure in chamber 64 will drop sufficiently to permit the full motor pressure acting on the annular area of check valve 50 to open the latter and thus relieve the excessive pressure in the motor port 36.

Figure 3:
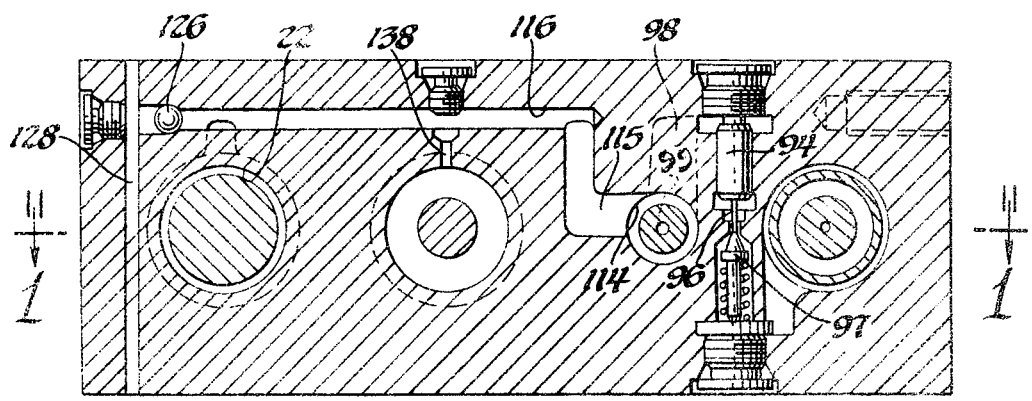
FIG. 3 is a sectional view on line 3–3 of FIG. 1.

The check valve 50 also serves as a counterbalance valve by reason of a small pilot piston 94 (FIG. 3) having a stem 96 capable of opening a pilot valve 97 when piston 94 is moved downwardly. For this purpose a passage 98 connects the top face of piston 94 with the port 28 through a passage 99, so that a certain small degree of forward operating pressure in port 28 must be developed before the check valve 50 will open to allow return flow from the motor port 36. The bottom of piston 94 is in direct communication with the port 28 through a passage 95. It will be noted that there are duplicate pilot valves 97 and passages 95, 98 and 99 for controlling the check valves 50 and 52, thus no matter whether the spool 16 has shifted to the left or the right pressure in either port 28 or port 30 will be directed to both small pistons 94. But because the same pressure is directed to the bottom of one piston 94 through passage 95 it can open only one pilot valve 97.

For controlling the inlet flow to the pressure port 24 there is provided a compensator valve 100 slideable in the bore 22 and biased to the left by a spring 102. The valve 100 has a land 104 which opens communication between inlet port 20 and pressure port 24 in the position illustrated. Compensator valve 100 also has a land 103 which in the position illustrated closes communication between pressure port 20 and a carry-over port 106 leading to the inlet port of the next sectional valve downstream; or to the tank if this section happens to be the last section of the bank. When shifted to the right, inlet port 20 is connected instead to the carry-over port 106. The inlet port 20 may receive fluid from the carry-over port 106 of an upstream sectional valve or, if it is the first valve in the bank, directly from the pump delivery line.

Valve 100 is exposed to pressure in port 24 over its left hand end through a hole 108 and a bore 110, thus tending to limit the pressure in pressure port 24. The chamber 112 at the right end of the bore 22 is connected with whichever one of the motor ports 28 or 30 is under the higher pressure at any time. This enables the compensator 100 to sense the load on the motor being controlled by the valve and to maintain a constant pressure drop between the pressure port 24 and the active one of the motor ports 28 or 30. This communication is established by passages 99 respectively leading from the motor ports 28 and 30 to a shuttle valve 118, the output of which connects to the chamber 112. Thus, the bore 114 in which the shuttle valve 118 is freely shiftable communicates by passages 115 and 116 with the left end of the bore 22.

Figure 2:
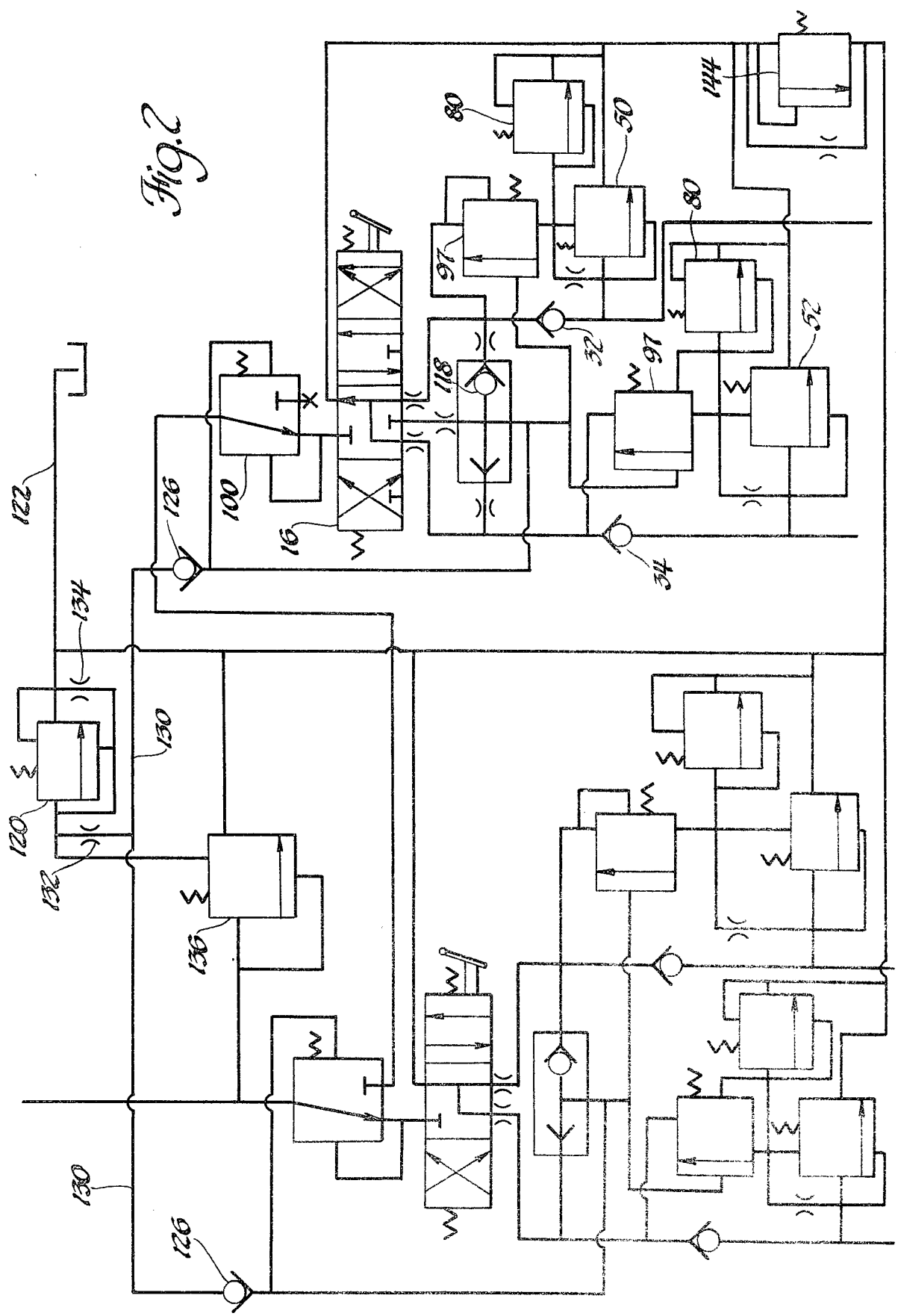
FIG. 2 is a circuit diagram of a power transmission system incorporating the valve of FIG. 1.

Preferably, there is provided outside of the valve body 12 a system compensating valve which is load responsive and is indicated diagrammatically at 136 in FIG. 2. This receives motor operating pressure from whichever valve in the bank of valves has the higher motor operating pressure and serves to spill off to tank through conduit 122 whatever fluid is not required for operating the motor or motors then being used. For this purpose a check valve 126 (FIG. 3) and a cross conduit 128 are provided in each valve section. These communicate by a conduit 130, FIG. 2, and restrictor 132 with the operating chamber of valve 136. A small bleed orifice 134 serves to slowly bleed that operating chamber allowing the valve to open at times when all spools are centered. In other words, it avoids trapping of fluid in the operating chamber of valve 136 when both check valves 126 are closed. A pilot relief valve 120 may also be provided, causing the valve 136 to limit maximum pressure in the pump delivery line 20.

For the purpose of obtaining a float condition, that is one in which both motor ports are connected to tank ports for free inter-circulation, the spool 16 may be shifted to the right past its normal operating position so that the land 27 lies just to the right of the port 138 in the sidewall of the bore 14. In this position, the left-hand edge of the land 27 still seals off pressure port 24 from motor port 28. Also, a land 140 seals off pressure port 24 from motor port 30, and a land 142 allows a small opening between motor port 30 and tank port 48. The opening of the small port 138 to inlet pressure delivers this pressure through conduits 116, 115, bore 114 and conduits 98 to the top surface in FIG. 3 of the small pistons 94 for both of the pilot valves 97. Thus, both check valves 50 and 52 are opened without, however, admitting pressure fluid to either of the ports 28 or 30 and the motor is thus permitted to float freely.

The circuitry associated with the valve 12 is illustrated in the right-hand half of FIG. 2. On the left-hand half, there is illustrated the circuitry of a similar valve except for its lack of a float position. Such a valve may be similar to that illustrated in my co-pending application, Ser. No. 548,651 filed concurrently herewith for Power Transmission. An external relief valve 144 may be provided if desired for maintaining a low back pressure between the tank passages of the valve 10 and the reservoir.

I claim:

1. A directional valve assembly for hydraulic power systems comprising a body having a sliding spool of the closed center type arranged to selectively direct inlet fluid to either of two motor ports, load holding check valves between the spool and each motor port, combined counter balance and relief check valves one connected between each motor port and a return port and each having a control piston exposed through a restriction to its respective motor port pressure, pilot valves for relieving the pressures on the respective control pistons at a pre-determined pressure level, and secondary pilot valves each responsive to operating pressure upstream from the load holding check valve for the opposite motor port, whereby each pilot valve controls one check valve to open it, either for limiting maximum pressure in its own motor port or in response to operating pressure at an opposite motor port and means controlled by the spool for directing inlet pressure to both secondary pilot valves at the same time for opening both counterbalance and relief check valves to bypass both motor ports to tank around the load holding check valves.

2. A valve as defined in claim 1 wherein the spool axis and the four check valve axis are in a common plane with the check valve axes parallel to the spool axis.

* * * * *